United States Patent Office 3,216,858
Patented Nov. 9, 1965

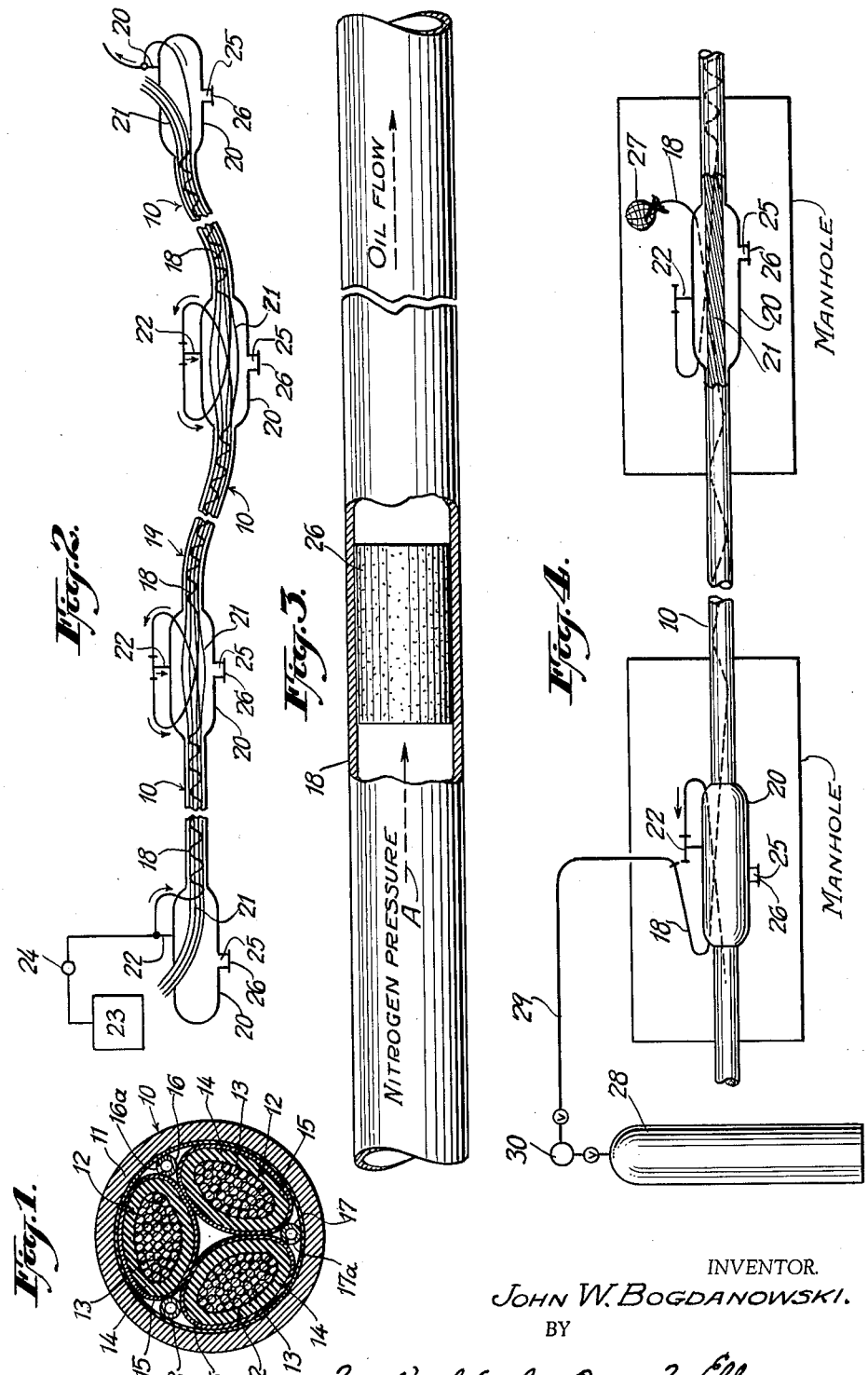

1

3,216,858
METHOD OF PURGING GAS-CONDUIT TUBING IN GAS-FILLED ELECTRIC CABLES
John W. Bogdanowski, Flushing, N.Y., assignor to Consolidated Edison Company of New York, Inc., New York, N.Y., a corporation of New York
Filed Apr. 26, 1963, Ser. No. 276,059
2 Claims. (Cl. 134—8)

This invention relates to electric cable of the gas-filled type as is used in the transmission of electric power, and more particularly to a technique for purging the gas-carrying conduits as are conventionally disposed within such cable. The conventional multi-conductor, low pressure type gas-filled electric cable to which the invention refers is that which is described in the Underground Systems Reference Book, 1957 edition, by Edison Electric Institute, New York, N.Y., and as illustrated by General Electric Works drawing K–6915304 dated May 26, 1939, available from General Electric Company, Schenectady, New York.

In such conventional gas-filled electric cable, several gas-carrying conduits are disposed therewithin, each lying within the spacing between adjacent current-carrying conductors, there usually being several such current-carrying conductors within the cable. The several conductors and gas-carrying conduits extend in a spiral pattern within a tubular lead sheath which defines the outer surface of the cable. Each of the current-carrying conductors is insulated by a relatively thick wrapping of oil impregnated paper and, as is well known, oil leakage from these wrappings often accumulates within the gas-carrying conduits and blocks the effectiveness of the gas which is maintained under pressure therein. It is apparent that such blockage initially occurs at locations of sag in the line and at the points of lower elevation of the gas conduits, such lower points being inherently formed by reason of the spiral disposition of the conduits. It is also apparent that such oil accumulations may not always flow into the conventional, hollow joint casings which are disposed intermediate the several cable sections which form the overall length of the power transmission line.

Heretofore, there has not existed a truly effective method for purging such oil accumulations from the gas-carrying conduits in gas-filled electric power transmission lines such as would avoid unearthing or other disturbing of all of the length of the transmission line during the purging operation, or such as would avoid the necessity for including a greater number of joint casings throughout the length of the transmission line than would otherwise be employed.

By the present invention there is provided a method involving the use of minimal apparatus and equipment for the purpose of purging such gas-carrying conduits of such oil accumulations, and it will be found that the method involves only a minimum expenditure of time and disruption of the normal gas-retaining function of the gas conduit being purged.

For a better appreciation of the invention, it should be noted that continuing and considerable maintenance costs are regularly incurred by the necessary periodic procedure in draining such leaked oil from the gas-carrying conduits of the system. Moreover, where a regular and frequent impregnating oil draining schedule is not adhered to, the resulting oil blockage prevents detection of any drop in gas pressure as would result, for example, from a rupturing of the cable sheath at a remote location from that of the gas supply and beyond the location of the oil blockage. It is therefore incumbent that the referred to gas-carrying conduits within such transmission lines be periodically purged of any oil as may have accumulated therein.

Excepting for the thoroughness of purging as is achieved by the method to be disclosed herein, it is not asserted that the method significantly reduces the frequency with which purging operations must be conducted. Rather, the method to be disclosed provides economy in such operations by reducing the time necessary to perform the same, and by avoiding the necessity for handling the entire length of the transmission line to insure that oil accumulations at low points within the cable have flowed to the joint casings for removal.

Briefly describing the present invention, a gas-carrying conduit within a gas-filled electric cable is purged of accumulated oil by introducing a small plug of rubber or the like into one end of the conduit, the plug having diameter for slidable passage therethrough, and moving the same through the conduit by pressure of an inert gas introduced behind the plug. For the brief period of purging operation, the oppposite end of the conduit is opened to the atmosphere, either directly or via the joint casing at which it terminates, and it will be apparent that oil accumulations ahead of the plug will be forced out of the conduit and out of the transmission line. For facilitating slidable passage through the conduit at dry sections therealong, a small amount of oil lubricant is introduced into the conduit with the plug. The inert gas which is introduced to move the plug is preferably nitrogen, and is applied to the conduit at high pressure, up to about 800 pounds per square inch. The plug is ejected at the opposite end of the conduit, and is recovered for subsequent use.

These and other objects, features and advantages of the invention will become more fully apparent from the following detailed description of the invention when taken together with the accompanying drawings in which:

FIGURE 1 is a cross-sectional showing of a typical gas-filled electric cable having gas-carrying conduits as may be purged in accordance with the present invention;

FIGURE 2 is a diagrammatic showing of an electric power transmission line formed by a number of sections of cable having a cross-section as shown in FIGURE 1;

FIGURE 3 is an enlarged sectional side elevation of one of the solid wall gas-carrying conduit of the cable as it would appear while being purged of accumulated oil in accordance with the present invention; and FIGURE 4 is a diagrammatic side elevation showing a portion of the transmission line of FIGURE 2 as it would appear while being serviced in accordance with the invention.

Referring first to FIGURE 1 of the drawings, a typical three-conductor, three phase gas-filled type cable 10 is illustrated in cross-section. Within its lead sheath 11, this conventional cable has in its esssentials three current-carrying conductors, each being generally indicated by reference numeral 12. Each conductor 12 is formed by a plurality of wires 13 having a relatively thick wrapping oil-impregnated material 14, such as oil-impregnated paper, and each has the usual surrounding electrostatic shield 15. Typically, the viscosity of the oil with which the material 14 is impregnated is 100,000 Saybolt Seconds Universal at 70° F. The three conductors 12 are twisted in spiral fashion throughout the length of the cable. The cable 10 typically has nominal outside diameter, i.e., the diameter of lead sheath 11, of 2¾".

The cable 10 further includes three gas-carrying conduits, each disposed within the spacing between adjacent cable pairs as shown, and it is apparent that these will also be twisted in similar spiral fashion throughout their lengths. Of course, only one typical arrangement for the gas-carrying conduits is illustrated, and it will be understood that, in other arrangements, a relatively straight gas-carrying conduit might be disposed within the conductor spacing at the center of the cable. However, regardless of their arrangement, and regardless of the diameter of the cable 10 which may vary as aforesaid, each of the gas-carrying conduits 16, 17 and 18 within the cable 10 conventionally has nominal inside diameter of ¼″, the range being from about 3/16″ to 5/16″ depending upon the manufacturer.

Each of two of the gas-carrying conduits 16 and 17 have openings 16a and 17a, respectively, therethrough and extending along its length, such openings being conventionally formed by helically winding the strip of material from which the conduit is made, leaving helically disposed spaces along the conduit. The other gas-carrying conduit 18 is a solid-wall conduit, such as may be formed by conventional tubing. In operation, an inert gas such as nitrogen is introduced and maintained at low pressure, from about 8 to 20 p.s.i., within the cable 10 via the gas-carrying conduits 16, 17 and 18 and, as known to those familiar with the art, the conduit openings 16a, 17a permit emission of the gas into surrounding relationship with the conductors 12.

Referring now to FIGURE 2, a typical electric power transmission line of the gas-filled type, and as generally indicated by reference numeral 19, is formed by joining a plurality of the cables 10. Each cable 10 has length of several hundred feet, and the transmission line may extend for several miles. For the purpose of distributing the inert gas in the system, and also for the purpose of draining oil accumulations therefrom as will be hereinafter referred to, an enclosed, hollow joint casing 20 is attached in the line at each of the conductor splice locations 21. At locations 21, each of the conductors 12 is connected by splicing to the corresponding conductor element of the next cable, the splice being suitably wrapped with insulating material. However, the helically wound gas-carrying conduits 16, 17 of each cable are terminated at their respective open ends leading into the joint casings 20 so that the inert gas is distributed from the casing 20 back through the helically wound or apertured gas-carrying conduits 16 and 17 and thence into surrounding relation with the conductors 12. All of the solid-wall gas-carrying conduits 18 are connected together to effectively extend continuously the length of the transmission line 19, excepting that gas bleed-off openings therein admit gas to each of the joint casings 20 for ultimate distribution through the apertured gas-carrying conduits 16, 17 as aforesaid.

In a conventional system as illustrated in FIGURE 2, the gas bleed-off from the connected solid-wall conduits 18 is effected through a T-fitting 22 within the line at each of the joint casings 20. It will be noted that the solid-wall conduit 18 is first led out of one end of the casing 20, through an opening (not numbered) therein, and then is connected to the T-fitting 22 which is attached at the exterior of the casing, as shown. This is for the purpose of raising the elevation of the solid-wall conduit 18 at the location of the bleed-off so as to minimize the possibility for the referred to oil accumulations within the casing 20, as the level thereof rises, from entering and blocking the flow of gas in the conduit 18. This type of connection arrangement is a well known expedient for such purpose.

The inert gas is introduced into the solid wall conduit 18 from a gas supply source 23 at one end of the transmission line 19, the gas first passing through a pressure regulator 24. At the other end of the line 19, a gas ballast chamber (not shown) may be provided at the end of the solid wall conduit 18, as is a usual practice.

It is a familiar problem that oil tends to leak from the oil-impregnated material 14, and it is apparent that, unless removed, the oil will accumulate within the cable 10 and block the gas passages as are provided by gas-carrying conduits 16, 17, the oil entering the same through the openings 16a, 17a therein. Moreover, the leakage may be such that especially at locations of sag in the line, the oil will fill the joint casings 20 and the interstices between the current-carrying conductors 12, it being remembered that considerable oil is contained in the sometimes miles-long length of the line.

The conventional manner of removing such oil accumulations depends upon inclusion of a bottom opening 25 in each of the joint casings 20, the bottom opening 25 having a removable closure 26. The closure 26 is simply removed to permit the accumulated oil to flow from the casing, and it is apparent that, even considering that each cable 10 in the transmission line 19 may be lifted, held momentarily in elevated position, and perhaps twisted there is little positive assurance that all of the accumulated oil has been removed from the line since oil deposits may still remain within the lows of the spiral configuration of any of the gas-carrying conduits 16, 17 and 18. Moreover, there is danger that lifting of the cable will cause temporary flooding of the joint casings 20, thereby permitting oil to back up through its T-fitting 22 into the solid-wall conduit 18.

In accordance with the present invention, however, each of the gas-carrying conduits 16, 17 and 18 may be completely purged of such accumulated oil without disturbing the natural pattern of suspension or other positioning of the transmission line 19, and fewer than otherwise of the joint casings 20 may be initially installed.

Referring first to FIGURE 3, the inventive method is shown as applied in purging the solid-wall conduit 18. It is seen that a cylindrical, solid plug 26, of rubber or like material, is inserted into the conduit and is driven therethrough by inert gas, such as nitrogen, applied at high pressure in the direction of arrow A. The plug 26 has diameter approximating the internal diameter of the conduit 18, such that it is slidable therein, and its length is approximately twice the internal diameter of the conduit. The inert gas is applied at a pressure sufficient to keep the plug 26 moving along the tubing, and may be as high as 800 p.s.i. The plug 26 will be forced through the conduit to ejection at the other end thereof, and it will be understood that the moving plug will force any accumulated oil from the conduit. It should be noted that the oil capacity of any of the conduits 16, 17 or 18 is about 1 gallon per 400 feet of length.

The preferred procedure in carrying out the purging operation is best described with reference to FIGURE 4. However, referring first to FIGURE 2, the presence of oil accumulation within the solid-wall conduit 18 at a location which is remote from the inert gas supply source 23 is usually indicated by a drop in gas pressure to below 8 p.s.i. in the line from the normal 13 p.s.i., for example. The partial blockage will be at some location between the point of low pressure reading, as measured by a gauge (not shown) as is installed at any joint casing location, and the gas supply source 23, and a study of the pressure readings at several of the joint casings will usually indicate the precise section of cable 10 within which the oil accumulation has occurred.

Referring now to FIGURE 4, the bottom openings 25 of the joint casings 20 at either end of the selected cable 10 are opened, by removal of their closures 26, to permit any oil accumulations to drain therefrom.

At each end of the cable 10, the gas-carrying conduit 18 to be purged is disconnected from the T-fitting 22 at each of the respective joint casings 20. If it is desired to purge the wholly interior-located apertured gas-carrying conduits 16 and 17, access to the ends thereof may be gained through removal of a cover-plate (not shown) of each joint casing 20. Of course, the end of the conduit in the adjacent cable should be plugged to prevent loss of cable gas therefrom.

By observation of either the transmission line 19 or of the apparent direction of flow of accumulated oil from the conduit, a determination is made regarding which end of the conduit is higher than the other, these being referred to herein as the "high" and "low" ends of the conduit, respectively.

To determine whether or not the conduit 18 (FIGURES 3 and 4) to be purged is leaking internally as by a rupture, the low end of the disconnected conduit is temporarily plugged, and inert gas at a pressure of about 30 p.s.i. is applied at the high end for a period of about five minutes. If a pressure drop or gas flow is detected, such is indicative of internal leakage and other repairs will be necessary. However, if constant gas pressure is maintained, the conduit is apparently in good condition and, after removal of the temporary plug at the low end, purging thereof is next accomplished as follows.

First apply up to 300 p.s.i. of inert gas pressure at the high end of the conduit 18 until the gas flows freely from the low end thereof. An amount of the accumulated oil may be expelled from the low end of the conduit during this procedure.

A net 27 is then placed loosely over the low end of conduit 18 to catch the plug 26, as will be described.

The plug 26 is then inserted in the conduit 18 at its high end and a high pressure gas supply source 28 is connected to the conduit as by a supply line 29, through a pressure regulator 30. Gas pressure is then applied only in amount sufficient to insure uninterrupted movement of the plug 26 through the conduit, constant plug movement being ascertained by an indication of gas flow at the regulator 30. Up to 800 p.s.i. may be applied, if necessary. The plug 26 will ultimately be expelled at the low end of the conduit, into the net 27. Considering the cross-sectional area of the ¼" diameter plug on which the gas pressure acts, gas pressure in the amount of 800 p.s.i. will exert a force of about 40 pounds on the plug 26 in urging the latter through the conduit.

Because of the known ionization effects of oxygen, neither air, nor carbon dioxide, which contains oxygen, may be used as a purging gas, and neither is considered an "inert gas" in accordance with this invention. Similarly, because of its air and water content, steam may not be used, and is therefore not considered an "inert gas." Of course, for obvious reasons, water cannot be used as a purging fluid. As previously noted, nitrogen is the preferred inert gas to be used, this for reasons of economy and the fact that nitrogen gas is within the cable during normal operation.

To insure complete purging of accumulated oil, it is suggested that a second plug 26 be blown through the conduit 18, in the same direction, after the first has been expelled therefrom. Of course, the same may be repeated several times, if believed necessary.

If, at the start of the purging operation, no oil is present on the interior surface of the conduit 18, a small amount of oil should be poured into the high end of the conduit to provide lubrication for the slidable movement of plug 26.

A record should be maintained of the amount of accumulated oil which has been removed from the line, this being measured upon collecting the same at the time when it is expelled from the conduit.

The conduit 18 is then restored to its normal connections at the T-fittings 22 at either end thereof, and normal line operation of the cable 10 is resumed.

It is apparent that one or more plugs 26 may be blown through either of the apertured gas-carrying conduits 16 and 17 to purge oil accumulations therefrom in the same manner.

Thus has been described a method of purging oil accumulations from within the gas-carrying conduits of a gas-filled electric power cable which achieves all of the objects of the invention.

What is claimed is:

1. The method of purging seepage accumulations of oil from a gas-carrying conduit having nominal inside diameter of about 0.25 inch and disposed substantially within a cable section of a gas-filled electric power transmission line comprising the steps of disconnecting said conduit from said transmission line to provide opposite open ends of the conduit at the respective ends of said cable section, inserting a substantially rigid cylindrical plug into one end of said conduit, said plug having diameter substantially equal to the internal diameter of said conduit whereby said plug is slidable within the conduit, and introducing nitrogen gas under high pressure, up to about eight hundred (800) pounds per square inch, into said one end of the conduit to force said plug to slide therethrough from said one end to emergence at the other end thereof.

2. The method of purging seepage accumulations of oil from a gas-carrying conduit having nominal inside diameter of about 0.25 inch and disposed substantially within a cable section of a gas-filled electric power transmission line comprising the steps of disconnecting said conduit from said transmission line to provide opposite open ends of the conduit at the respective ends of said cable section, connecting a supply of nitrogen gas to one end of said conduit and introducing said gas thereinto under pressure of from about thirty (30) to three hundred (300) pounds per square inch continuously until the same flows freely through said conduit, then disconnecting said gas supply, inserting a substantially rigid cylindrical plug of rubber or the like into said one end of the conduit, said plug having diameter substantially equal to the internal diameter of said conduit, and said plug and conduit having lubrication oil between them whereby said plug is slidable within the conduit, and then introducing nitrogen gas under high pressure, up to about eight hundred (800) pounds per square inch, into said one end of the conduit to force said plug to slide therethrough from said one end to emergence at the other end thereof.

References Cited by the Examiner

UNITED STATES PATENTS

| | | | |
|---|---|---|---|
| 1,547,440 | 7/25 | Penn | 15—104.06 |
| 1,683,429 | 9/28 | Walker | 15—104.06 |
| 2,567,475 | 9/51 | Hall | 15—104.06 X |
| 2,623,226 | 12/52 | Jones et al. | |
| 2,763,017 | 9/56 | Redin | 15—104.06 |
| 2,874,078 | 2/59 | Reinhart | 15—104.06 X |
| 2,906,650 | 9/59 | Wheaton | 15—104.06 X |
| 2,930,584 | 3/60 | Hensley et al. | 15—3.52 X |
| 3,091,433 | 5/63 | Riley | 15—104.06 X |
| 3,119,600 | 1/64 | Bitter | 15—104.06 X |

OTHER REFERENCES

Electrical World, vol. 91, No. 25, page 1334, June 23, 1938.

MORRIS O. WOLK, *Primary Examiner*.